(12) United States Patent
Jokinen et al.

(10) Patent No.: US 10,492,061 B2
(45) Date of Patent: Nov. 26, 2019

(54) TERMINAL, DEVICE AND METHODS FOR A COMMUNICATION NETWORK

(71) Applicant: Nokia Technologies Oy, Espoo (FI)

(72) Inventors: Jukka Jokinen, Tampere (FI); Arto Kiiskinen, Espoo (FI); Petri Lehtovirta, Pirkkala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/443,935

(22) Filed: Feb. 27, 2017

(65) Prior Publication Data

US 2017/0238170 A1 Aug. 17, 2017

Related U.S. Application Data

(63) Continuation of application No. 10/262,681, filed on Sep. 30, 2002, now abandoned.

(51) Int. Cl.
| | |
|---|---|
| *H04W 8/22* | (2009.01) |
| *H04W 88/06* | (2009.01) |
| *H04W 8/24* | (2009.01) |
| *H04L 29/08* | (2006.01) |
| *G06F 21/44* | (2013.01) |
| *H04L 29/06* | (2006.01) |

(52) U.S. Cl.
CPC ............ *H04W 8/245* (2013.01); *G06F 21/44* (2013.01); *H04L 67/289* (2013.01); *H04L 67/42* (2013.01); *H04W 8/22* (2013.01); *H04W 88/06* (2013.01)

(58) Field of Classification Search
CPC ........ H04L 67/289; H04L 67/42; H04W 8/00; H04W 88/06; H04W 8/22; H04W 8/245; H04W 8/24

USPC .......................................................... 455/558
See application file for complete search history.

(56) References Cited

U.S. PATENT DOCUMENTS

| | | | |
|---|---|---|---|
| 5,794,142 | A | 8/1998 | Vanttila et al. |
| 6,052,581 | A | 4/2000 | O'Connell et al. |
| 6,188,909 | B1 | 2/2001 | Alanara et al. |
| 6,216,015 | B1 | 4/2001 | Hymel |
| 6,353,737 | B1 | 3/2002 | Herzog |
| 6,381,454 | B1 | 4/2002 | Tiedemann, Jr. et al. |
| 6,490,463 | B1 * | 12/2002 | Portalier ............... H04W 8/245 455/410 |

(Continued)

FOREIGN PATENT DOCUMENTS

| | | |
|---|---|---|
| EP | 0786915 A2 | 7/1997 |
| EP | 1131969 B1 | 9/2007 |

(Continued)

OTHER PUBLICATIONS

International Preliminary Examination Report of the Corresponding International Application No. PCT/IB03/04127 dated Nov. 22, 2004, pp. 1-7.

(Continued)

*Primary Examiner* — Khawar Iqbal
(74) *Attorney, Agent, or Firm* — Ditthavong & Steiner, P.C.

(57) ABSTRACT

A mobile communication terminal, a service provider device and methods are disclosed wherein a plurality of services from a service provider is supported. According to the invention the storing of service provider settings, which are related to the service provider, in a memory location specific for the service provider is facilitated.

15 Claims, 4 Drawing Sheets

(56) References Cited

U.S. PATENT DOCUMENTS

| | | | |
|---|---|---|---|
| 6,493,549 B1 | 12/2002 | Axelson et al. | |
| 6,549,770 B1 | 4/2003 | Marran | |
| 6,549,771 B2 | 4/2003 | Chang et al. | |
| 6,557,753 B1* | 5/2003 | Beaujard | G06K 7/065 235/375 |
| 6,587,685 B2 | 7/2003 | Mittal et al. | |
| 6,591,116 B1* | 7/2003 | Laurila | H04W 8/24 455/552.1 |
| 6,625,451 B1 | 9/2003 | La Medica, Jr. et al. | |
| 6,993,328 B1 | 1/2006 | Oommen | |
| 7,295,522 B2 | 11/2007 | Shell et al. | |
| 8,054,971 B2* | 11/2011 | Weiner | H04M 1/72552 380/229 |
| 2001/0023446 A1* | 9/2001 | Balogh | H04W 48/18 709/229 |
| 2002/0016186 A1* | 2/2002 | Chambon | G06Q 20/341 455/558 |
| 2002/0154632 A1* | 10/2002 | Wang | H04W 48/18 370/389 |
| 2003/0003933 A1* | 1/2003 | Deshpande | H04L 29/06 455/510 |
| 2003/0108039 A1 | 6/2003 | Shell et al. | |
| 2003/0125073 A1* | 7/2003 | Tsai | H04W 68/02 455/552.1 |
| 2004/0022216 A1* | 2/2004 | Shi | H04W 76/10 370/335 |
| 2004/0203648 A1* | 10/2004 | Wong | H04W 4/18 455/414.1 |
| 2004/0203941 A1 | 10/2004 | Kaplan et al. | |
| 2004/0214572 A1* | 10/2004 | Thompson | H04L 12/1464 455/435.2 |
| 2005/0197111 A1 | 9/2005 | Alanara et al. | |
| 2006/0058011 A1 | 3/2006 | Vanska et al. | |
| 2006/0116507 A1* | 6/2006 | Oppermann | H04W 48/08 455/434 |
| 2006/0193321 A1 | 8/2006 | Shell et al. | |
| 2007/0091845 A1* | 4/2007 | Brideglall | H04W 36/04 370/331 |
| 2009/0005039 A1 | 1/2009 | Kuhn | |
| 2010/0099454 A1* | 4/2010 | Reddy | H04L 29/12009 455/552.1 |
| 2012/0052914 A1* | 3/2012 | Yaqub | H04L 63/0853 455/558 |

FOREIGN PATENT DOCUMENTS

| | | |
|---|---|---|
| GB | 2287855 A | 9/1995 |
| WO | 9732439 A2 | 9/1997 |
| WO | 0046709 A2 | 8/2000 |
| WO | 0186985 A1 | 11/2001 |

OTHER PUBLICATIONS

European Office Action received for the Corresponding European Patent Application No. 03798318.6-2412 dated Jan. 20, 2010, pp. 1-2.

* cited by examiner

TERMINAL, DEVICE AND METHODS FOR A COMMUNICATION NETWORK

RELATED APPLICATION

This application is a continuation of application Ser. No. 10/262,681, entitled "Terminal, Device and Methods for a Communication Network," filed on Sep. 30, 2002, the contents of which are hereby incorporated herein in their entirety by this reference.

FIELD OF THE INVENTION

The invention generally relates to service provision in mobile communication systems. More specifically, the invention relates to a mobile communication terminal, a service provider device, and methods wherein a plurality of services from a service provider is supported.

BACKGROUND OF THE INVENTION

During the past years mobile communication systems have been extended with new services, such as Instant Messaging, SyncML, Presence, MMS, etc. which are based on a client-server architecture. Such services are supported in a mobile communication terminal using an application in the mobile communication terminal. Furthermore, a number of settings are required which define configurations for connecting to, authenticating with, defining service preferences for, etc., each service of service providers.

In order for a user of a mobile communication terminal to use such a client-server based service in prior art communication systems, the user first needs to order the service from a service provider. Then the user needs to configure one or more client applications in the communication terminal. This is manually done by entering settings, such as connectivity server, username, password, etc. and storing these settings in the application(s) in the mobile communication terminal. When using the service, the application(s) then uses the service provider settings when connecting to, authenticating with, defining service preferences for, the client-server based service.

In some prior art system, e.g. as disclosed in WO 97/32439, Lehtonen, A. et al, and U.S. Pat. No. 6,188,909, Alanara S. et al, settings may be sent to a mobile communication terminal in a short message. The short message includes an identification part identifying the application in the mobile communication terminal to which the settings are to be directed.

With the increase of client-server based services supported in a single communication terminal, the number of service provider settings stored in the mobile communication terminal increases. This gives rise to a problem in the prior art with an increasing complexity of management of the service provider settings. For example, it will be difficult to identify the location of service provider settings, to know which settings may be changed, edited, added, deleted, etc., and to ensure that a correct updated version of the setting are used.

Furthermore, with the increase of the number of service provider settings to be stored, the amount of memory used for such storage increases.

In addition to the amount of client-server based services, also the need for updating the service provider settings due to e.g. location specific settings, i.e. service provider settings which will differ depending on the location of the mobile communication terminal, time specific settings, i.e. service provider settings which will differ depending on the time of day, etc. is increasing. This further increases the problem with the complexity of management of the service provider settings in prior art.

The complexity of the management of the service provider settings in prior art makes it difficult for users of a mobile communication terminal to set up the mobile communication terminal in order to use a new service from a service provider.

SUMMARY OF THE INVENTION

The invention overcomes or alleviates the problems in prior art by means of a mobile communication terminal, a service provider device, and methods wherein a plurality of services from a service provider is supported.

The invention makes use of the recognition of the advantage of centralized storing of service provider settings in a mobile communication terminal, the service provider settings being settings intended for use in the mobile communication terminal when services of a service provider are used.

According to a first aspect of the invention a mobile communication terminal is provided capable of supporting one or more services of a service provider. The mobile communication terminal comprises a storage device (memory structure) which is arranged to store service provider settings, which are related to the service provider. More specifically the storage device is arranged to store the service provider settings in a memory location specific for the service provider.

The storing of the service provider settings in a memory location specific for the service provider simplifies the management of these service provider settings. For example, after a storing of the service provider settings in the mobile communication terminal for a first service has been done, any further services of the service provider for which these settings are needed do not require any additional storing of these settings in a different memory location. The further services simply make use of the present service provider settings the memory location specific for the service provider. Furthermore, in any future updates of the service provider settings related to a service provider, the settings are easily located in the memory location specific for the service provider. In addition to this, the possibility of restricting the access to the service provider settings is simplified when these settings are stored in a specific memory location. This is particularly advantageous in cases where the server provider settings are of a security critical nature, such as when the service provider settings pertain to settings for enabling mobile commerce.

It is to be noted that the fact that the mobile communication terminal is capable of supporting a service of the service provider does not mean that the terminal is actually supporting the service. Instead, this should be interpreted that given the appropriate settings, application(s) etc, the terminal will support the service. Thus, the situation where the terminal is not actually supporting any services from a service provider, but the memory of the terminal is arranged to store service provider settings for that service provider in a memory location specific for that service provider lies within the scope of the invention.

In a first embodiment of the mobile communication terminal according to the invention, the storage device is arranged to store the service provider settings in response to receiving them from a remote device. These service provider settings are preferably received wirelessly in one or more messages, such as a short message in a GSM mobile communication terminal. The reception of the service provider setting from a remote device simplifies the management of the service provider settings. In particular, the reception of the service provider settings in one or more messages does not only include the reception of the service provider settings a first time, but also subsequent receptions of the service provider settings. The subsequent receptions of the service provider settings replace the stored service provider settings in the memory location specific for the service provider, i.e. the service provider settings are updated. Thus, the updating of service provider settings may be done wirelessly and it is ensured that all applications accessing and using the service provider settings will use the latest updated version of the settings.

Of course the mobile communication terminal is not limited to a GSM mobile communication terminal but may be a mobile communication terminal for a mobile communication system using any other present or future communication technology. Furthermore, for GSM and for other communication technologies, a suitable format for receiving the service provider settings will be readily apparent to a skilled person.

In the case when service provider settings related to several different service providers are stored in the mobile communication terminal, said one or more messages further preferably comprise an identification of the service provider to which the settings pertain. The presence of an identification of the service provider in the message will simplify the identification of the memory location specific for the service provider settings in which the settings are to be stored. This identification of the service provider is of course also applicable in the case where service provider settings related to only one service provider are stored in the mobile communication terminal.

In a second embodiment of the invention the memory is further arranged to store service provider settings in such a way that an updated version of a setting of the service provider settings replaces a present version of that setting in the memory location specific for the service provider.

This means that only one instance of a setting of the service provider settings will be stored in the memory location specific for the service provider when that setting is updated, which will further simplify the management of the server provider settings. More specifically, this will provide for the possibility for each of the service provider settings, which are used by several services of the service provider, to be stored only once. Furthermore, when updating such settings, there is no need to update the settings for each one of the services separately. This will result in a minimum usage of the memory space in the mobile communication terminal for storing the service provider settings and ensure that the correct server settings are used in all services when an update of the service provider settings is received.

In a third embodiment of the mobile communication terminal according to the invention, the service provider settings comprise service authentication information for a user to access said one or more services via the mobile communication terminal.

This is particularly advantageous when the authentication information, such as username and password, for a user to access several services of a service provider via the mobile communication terminal is the same for these several services. In this case, when the authentication information is updated, the third embodiment ensures that the updated authentication information is used for all these several services.

In a fourth embodiment of the mobile communication terminal according to the invention, the service provider settings comprise service connectivity information for a user to access said one or more services via the mobile communication terminal.

This is particularly advantageous when the connectivity information, such as username and password, for a user to access several services of a service provider via the mobile communication terminal is the same for these several services. In this case, when the connectivity information is updated, the fourth embodiment ensures that the updated connectivity information is used for all these several services. Of course, the service provider settings may comprise several other settings other than the ones in the first and second embodiments, such as service, application, client specific settings, etc.

In a fifth embodiment of the mobile communication terminal according to the invention, the storage device is arranged to store the service provider settings in response to a reception of an indication of an acceptance from the user. This increases the security of the mobile communication terminal in terms of service provider settings, since the service provider settings will not be stored unless the user accepts it.

In order to ensure that the user input is received from an authorized user, it preferably comprises user authentication information, such as a personal identification number (PIN) code. This further increases the security of the mobile communication terminal in terms of service provider settings, since correct authentication information, such as a correct PIN code will increase the level of certainty that the acceptance indication is received from an authorized user.

The mobile communication terminal according to the invention may further comprise a security arrangement for preventing unauthorized access to the service provider settings. Such an security arrangement may for example be arranged to restrict the access to the service provider settings related to a service provider to the user, one or more specific applications, i.e. other applications are prevented from accessing this subset of the service provider settings, and/or the service provider to which the settings pertain. Furthermore, such a security arrangement may also be arranged to restrict the possibility of changing the service provider settings to the service provider to which the settings pertain, i.e. the user of the terminal and/or the applications in the terminal may not alter the service provider settings.

The mobile communication terminal according to the invention may further comprise one or more applications for use in the one or more services of the service provider. The applications are arranged to access at least a subset of the service provider settings in the memory location specific for the service provider. The service provider settings are then used in the one or more applications when the one or more services of the service provider is used.

According to a second aspect of the invention a service provider device being capable of providing one or more services from a service provider is provided. The device comprises a sending device which is arranged to send messages to mobile communication terminal. The message comprises service provider settings related to the service provider and an identification of the service provider.

The provision of an identification of the service provider in a message sent to a mobile communication terminal facilitates the storage of the service provider settings in a memory location in the mobile communication terminal, which memory location is specific for the service provider.

The sending device of the service provider device according to the invention is preferably arranged to send the message to a mobile communication terminal in response to the reception of a request from the mobile communication terminal, wherein the request pertains to any one of the one or more services of the service provider.

According to a third aspect of the invention, a method in a mobile communication terminal is provided, the terminal being capable of supporting one or more services of a service provider. According to the method service provider settings are stored in the mobile communication terminal, which are related to the service provider, in a memory location specific for the service provider.

According to a fourth aspect of the invention a method in a service provider device is provided, the device being capable of providing one or more services from a service provider. In the method a message is sent to a mobile communication terminal, the message comprising service provider settings related to the service provider and an identification of the service provider.

BRIEF DESCRIPTION OF THE FIGURES

In the following, the present invention is illustrated by way of example and not limitation with reference to the accompanying drawings, in which.

DETAILED DESCRIPTION OF THE INVENTION

Figure 1:
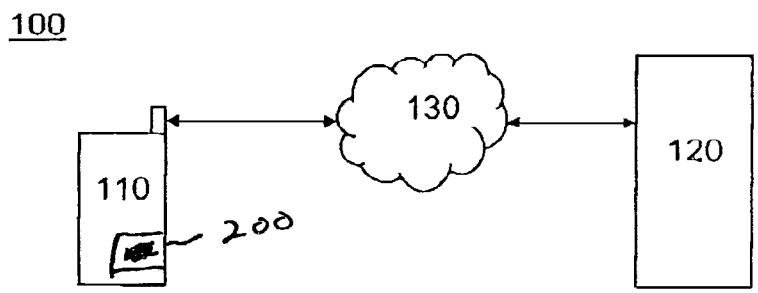
FIG. 1 is a schematic diagram of a system in which the invention is advantageously implemented.

In FIG. 1, a schematic diagram of a system 100 in which the invention is advantageously implemented is shown. A mobile communication terminal 110 is connected to a service provider device 120 via a communication system 130. In the system 100 one or more client-server based wireless services are provided using one or more client applications in the mobile communication terminal 110 and one or more server applications in the service provider device 120. In order to facilitate the order and use of client-server based services, the invention provides for the wireless sending of service provider settings from the service provider device 120 to the mobile communication terminal 110, and the storage device of such service provider settings is a memory structure 200 (also called a storage device such as any type of read/write memory known in the art) in the mobile communication terminal 110 in a way which facilitates simple management of such settings which will be described below with reference to FIG. 2.

In alternative to FIG. 1, the server application may be located in another device than the server provider device 120 from which the service provider settings are sent to the mobile communication terminal 110. Furthermore, it is to be noted that it is not necessary according to the invention that the service provider settings are sent wirelessly to the mobile communication terminal. The settings may also by stored in the mobile communication terminal 110 by means of a wire connection at the time of manufacturing, when updating the terminal at a later stage, etc. The settings can also be sent via other means, such as for example Bluetooth™, or IR, cell broadcast, WLAN, and other means suited for message delivery.

Figure 3:
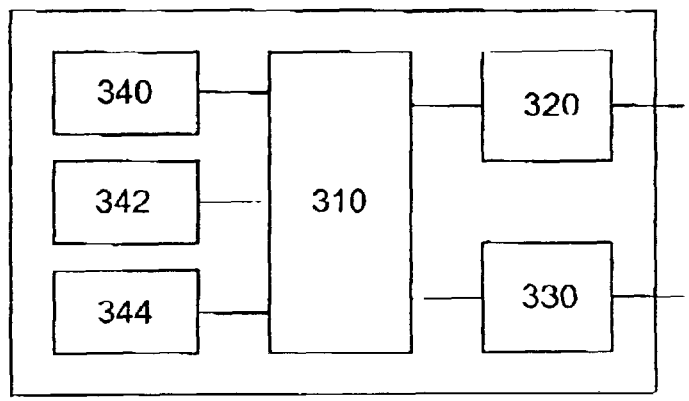
FIG. 3 is a schematic block diagram of an embodiment of a mobile communication terminal according to the invention.

In addition to the above, the service provider settings may also be configured manually which is described further with reference to FIG. 3.

Figure 2:
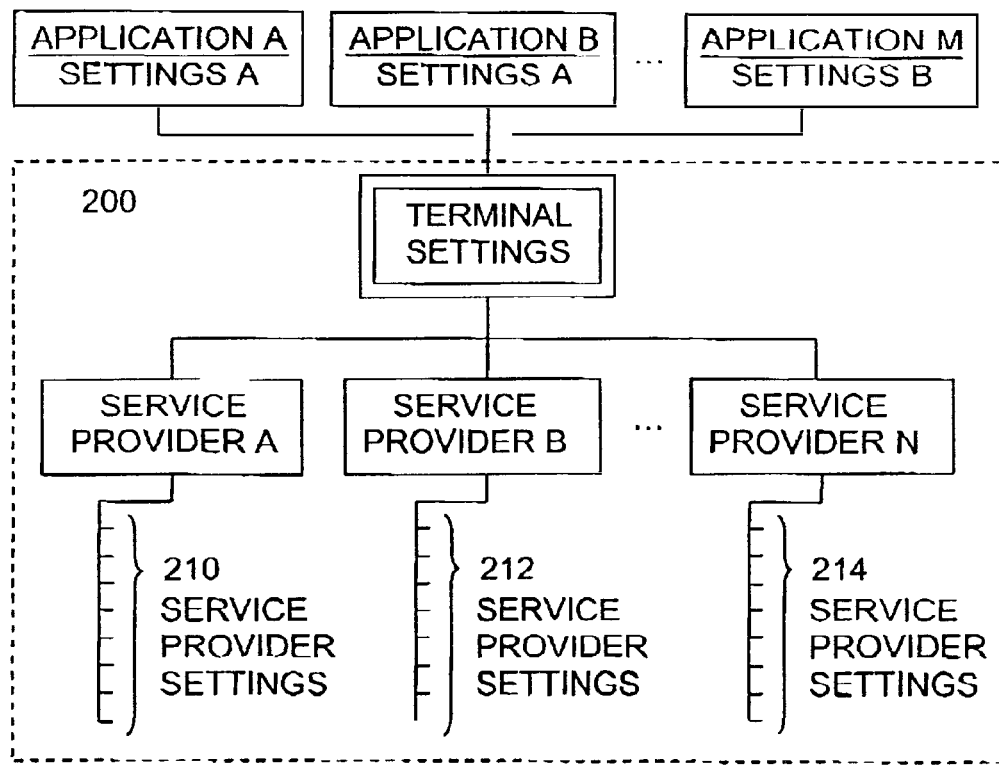
FIG. 2 is a block diagram showing a schematic view of a memory structure in an embodiment of a mobile communication terminal according to the invention.

In FIG. 2, a block diagram is provided showing a schematic view of the memory structure 200 of a memory in an embodiment of a mobile communication terminal according to the invention. Service provider settings 210, 212, 214 related to service providers A, B, N are stored in the memory structure 200. The service provider settings 210 relating to the service provider A are stored in a memory location which is specific for the service provider A, the service provider settings 212 relating to the service provider B are stored in a memory location which is specific for the service provider B, etc. The service provider settings are typically authentication settings, such as username and password, connectivity settings, such as service provider URL and service URL, service specific settings, service specific error messages, settings for mobile commerce etc. Furthermore, the service provider settings for each service provider are stored in such a way, that each setting occurs only once in the memory location specific for the service provider. Thus, when updating a service provider setting for a service provider, the update need only be done for the only occurrence of the setting.

In addition to the memory structure 200 of the mobile communication terminal, FIG. 2 shows applications A, B, . . . , M in the mobile communication terminal. These applications are used in client-server based services provided by the service providers A, B, . . . , N. For each application in the mobile communication terminal, there is an indication of which service provider settings are to be used. For example, it is indicated that when application A is used, the settings for service provider A should be used.

In addition to the indication of which service provider settings should be used for each application, the access to a memory location in which service provider settings for a service provider is stored, may be restricted to one or more certain applications, i.e. other applications are not granted access to the service provider settings in this memory location. Furthermore, the alteration of service provider settings may be restricted. For example, the service provider settings may be read only for the applications in and the user of the mobile communication terminal. The level of security, i.e. access and alteration restrictions may differ between service provider settings relating to different service providers.

Furthermore, in addition to what is disclosed in FIG. 2, service provider settings for one service provider may be stored in the memory for different users of the mobile communication terminal. The service provider settings to be used may be determined in response to the entering of different PIN codes by the different users. Service provider settings can also be connected to other service provider settings; e.g. a e-commerce setting (VISA card number) may be connected to other service provider settings as a preferred payment method.

With reference to FIG. 3, a schematic block diagram of an embodiment of a mobile communication terminal 300 according to the invention is shown. The mobile communication terminal 300 is capable of supporting one or more services from a service provider. The mobile communication terminal 300 comprises memory 310. Furthermore, a receiver 320, a user input interface 330, and a set of applications 340, 342, 344 are operatively connected to the memory 310. The receiver 320 is arranged to receive messages comprising service provider settings and a service provider identification from a remote device, e.g. a service provider device. In the case where the mobile communication terminal 300 is a GSM mobile phone, the message may be a Short Message Service (SMS) message using enhanced Smart Message format. For terminals for other present or future communication technologies, a suitable message format will be apparent to the skilled person. The user input interface 330 is arranged to receive user input in the form of an acceptance indication. The acceptance indication may for example be entered by the user using the key pad, using voice control or any other means of entering user input of the mobile communication terminal. Furthermore, the acceptance indication may require a Personal Identification Number (PIN) code, a voice print, etc. When service provider settings have been received in the receiver 320, the service provider settings are then stored automatically in the memory in accordance with the memory structure described with reference to FIG. 2, only in response to the reception of the user acceptance indication in the user input interface 330. The service provider settings for the service provider are stored in such a way that each setting occurs only once in the memory location specific for the service provider. Of course, it is possible to store several instances of one or more settings, however it is preferred to store only one instance. The applications 340, 342, 344 are applications which are to be used in client-server based services provided by service providers. In the applications it is indicated to which service provider the application pertains. When an application is used, it will access and use the service provider settings in the memory location specific to the service provider to which it pertains.

As a first example with reference to FIG. 3, when ordering a new client-server based service of service provider for which service provider settings are present in the mobile communication terminal, a present application 342 is to be used. For the case where the client application is not present, such an application is installed manually by the user or is downloaded to the mobile communication terminal. The order of the service is received in a service provider device of the service provider, and the service provider device sends a message to the mobile communication terminal comprising service provider settings, including service settings for the new service and a service provider identification. Such a message may for example be a SMS message using Smart Message format in the case where the mobile communication terminal is a GSM mobile telephone. When the message is received in the receiver 320, the service provider settings in the memory location specific for the service provider are updated with the new settings. The updating is simple since the service provider settings are present in a memory location specific for the service provider. Thus, in this memory location, service provider settings, which are already present, need not be updated. In fact, it could be the case that all service provider settings needed for the new service are already present in the memory location specific for the service provider. Then, instead of updating the application 342 used in the new service, the application 342 accesses the service provider settings in the memory location specific for the service provider. Furthermore, the fact that each setting occurs only once in the memory location specific for the service provider, ensures that each application will always use a latest updated version of a service provider setting since it will not store a local version of the setting but will access the version stored in the memory location specific for the service provider to which the setting pertains.

As a second example with reference to FIG. 3, application 340 is a client application for use of a client-server based game service in a service provider device of a service provider. The service provider settings for the service provider are game service URL, username and password for the service, game settings, and service specific error messages. The application 340 accesses the server provider settings and uses the game service URL, username and password when connecting to and authenticating with the service provider device comprising the server application for the game service. Furthermore, the game settings are then used when using the service. If an error occurs for the game service, the service specific error messages are used in order to enable more detailed information on the nature of the error. Such an error message may be "The game service has too many users currently. Try again later" or "Your service subscription has ended. Please renew your subscription at www.club.nokia.com".

As a third example with reference to FIG. 3, the present application 344 is to be used for a new mobile commerce service from a service provider. The order of the service is received in a service provider device of the service provider, and the service provider device, sends a message to the mobile communication terminal comprising a service provider identification and service provider settings, in particular a password for use in the mobile commerce service. When the message is received in the receiver 320, the service provider settings, in particular the password for the mobile commerce service, are stored in the memory location specific for the service provider. In this case the memory location specific for the service provider is a secure memory location to which access is restricted.

In addition to the examples above with reference to FIG. 3, the message comprising the service provider settings and the service provider identification may be pushed to the mobile communication terminal from a remote device without any active operation by the user of the mobile communication terminal. For example, in the case where the service provider settings have been updated in the remote device, these updated settings may be pushed directly to mobile communication terminals affected by the update. Also, service provider settings may be location dependent. Thus the fact that a mobile communication terminal is moved to another area may give rise to the need for receiving updated service provider settings. In this case the updated settings may be pushed directly to mobile communication terminal.

Furthermore, in a specific case, after the acceptance from a user to subscribe to a new service, all software and service provider settings, etc. needed for the new service may be downloaded and installed into the mobile communication terminal automatically from the service provider device. Furthermore, any updates of the software and/or the service provider settings may be pushed automatically from the service provider in a message comprising these updates and a identification of the service provider and automatically implemented in the mobile communication terminal without any need for user interaction.

Furthermore, the settings may also be configured manually. In this case the benefit of automatic updating will not be achieved. However, the advantages of having the service provider settings in a memory location specific for the service provider is still achieved, e.g. simplicity of finding and updating the service provider settings, the ensuring of the using of the same updated version of the service provider settings by the applications, etc.

Figure 4:
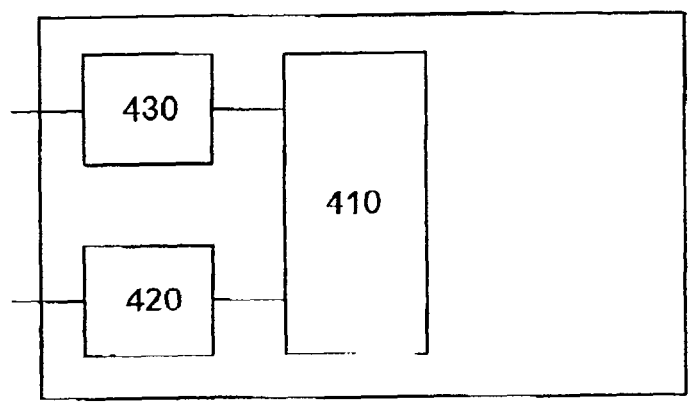
FIG. 4 is a schematic block diagram of an embodiment of a service provider device according to the invention.

With reference to a service provider, FIG. 4 is a schematic block diagram of an embodiment of a service provider device 400 according to the invention. The service provider device 400 comprises a processor 410, and a receiver 420 and a sender 430 connected to the processor 410. The receiver 420 is arranged to receive an order related to a mobile communication terminal of a service provided from the service provider device 400 and to provide the order to the processing means. The processor 410 is arranged to include service provider settings relating to the ordered service in a message and the sender 430 is arranged to send the message to the mobile communication terminal. In particular, the processor will include a service provider identifier in the message in order to facilitate the storing of the service provider settings in the mobile communication terminal in a memory location specific for the service provider. Furthermore, the processor is also arranged to respond to an update of service provider settings pertaining to the service provider. For example, if the connectivity settings is changed for a service of the service provider to which a user of a mobile communication terminal subscribes, the processor will arrange the updated settings in a message and the sender 430 will send the message to the mobile communication terminal.

Figure 5:
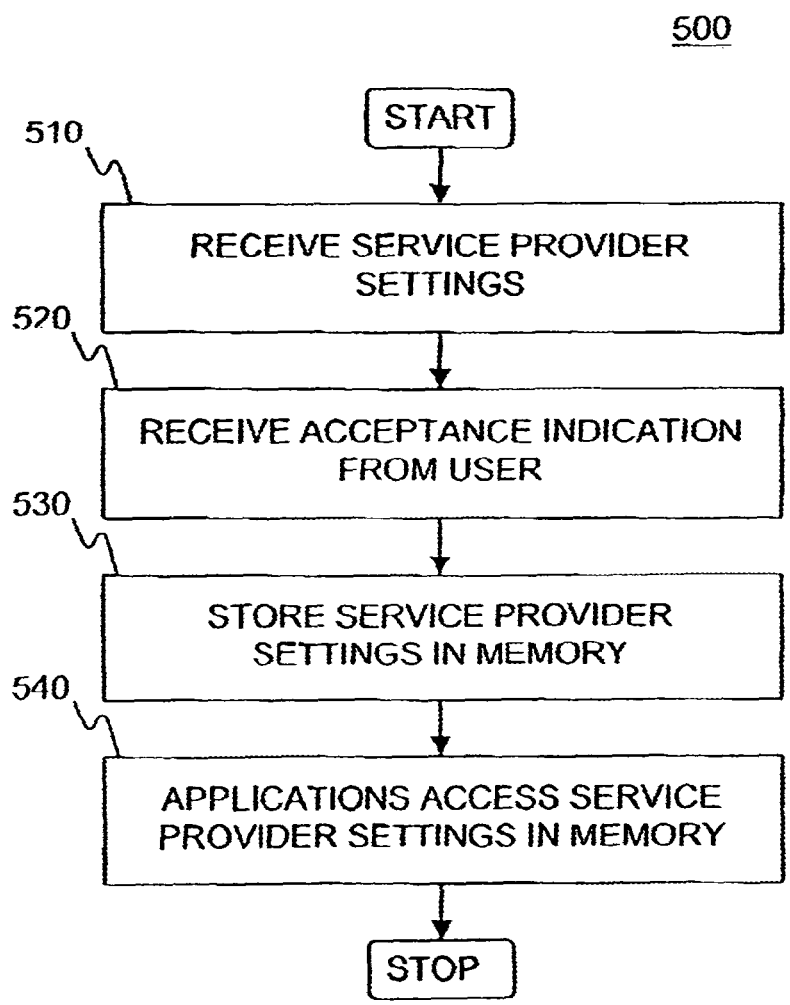
FIG. 5 is a flow chart of an embodiment of a method in a mobile communication terminal according to the invention.

FIG. 5 is a flow chart 500 of an embodiment of a method in a mobile communication terminal according to the invention. A user of a mobile communication terminal wants a mobile communication terminal to set up for a new client-server based service of a service provider. Thus, the user has ordered the service from the service provider. Alternatively, the mobile communication terminal has already been set up for the service, but for some reason the service provider settings relating to the service provider are outdated or inaccurate. Thus, in order to use the service a client application in the mobile communication terminal needs correct service provider settings relating to the service provider and the service. Thus, in step 510 such service provider settings are received in a message over the air, e.g. from a service provider device in which a server application for the new service is present. After receiving the message the user accepts the storing of the service provider settings by indicating this via a user input interface, e.g. by entering a personal indication number (PIN) code. The acceptance indication, e.g. the PIN code, from the user is received in the mobile communication in step 520 and the service provider settings are stored in a memory location in the mobile communication terminal in step 530. More specifically, the service provider settings are stored in a memory location, which is specific for the service provider, in such a way that each setting of the service provider settings occur only once in the memory location specific for the service provider. For the case where the mobile communication terminal already has already been set up for the service, but the service provider settings are outdated or inaccurate, the updated service provider settings will replace the outdated or inaccurate ones.

Finally, when using the service, in step 540 the client application in the mobile communication terminal accesses and uses the service provider settings.

Figure 6:
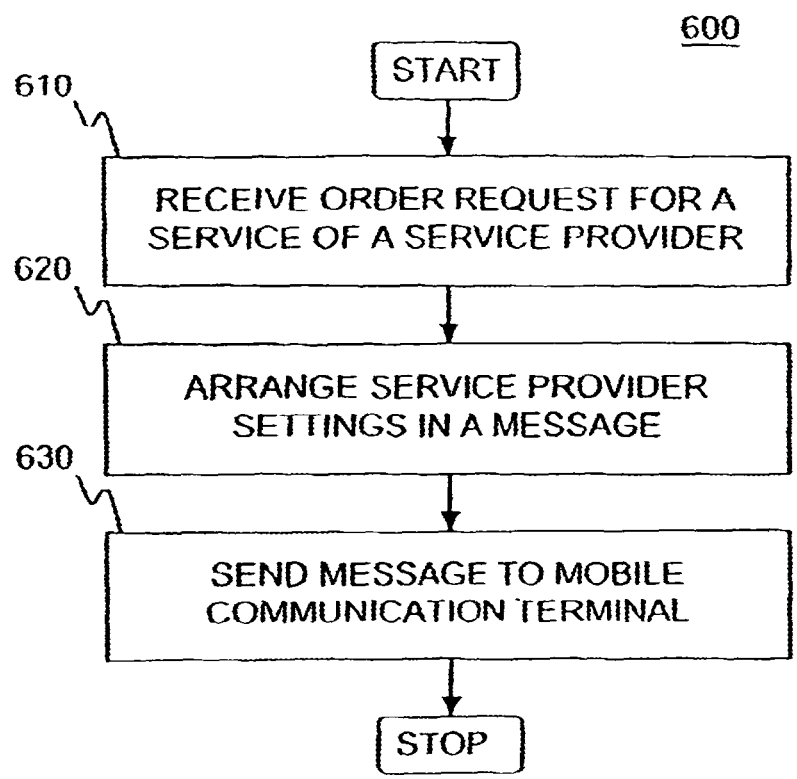
FIG. 6 is a flow chart of an embodiment of a method in a service provider device according to the invention.

FIG. 6 is a flow chart 600 of an embodiment of a method in a service provider device according to the invention. A user of a mobile communication terminal wants to use a new service of a service provider. Thus, the user orders the service from the service provider. In step 610 the order of the service provided from the service provider device is received in the service provider device. The service provider settings relating to the ordered service is then arranged in a message in step 620 and the message is sent to the mobile communication terminal in step 630. In particular, a service provider identifier is arranged in the message in order to facilitate the storing of the service provider settings in the mobile communication terminal in a memory location specific for the service provider.

What is claimed is:

1. An apparatus comprising:
   at least one processor; and
   at least one memory including computer program code for one or more programs,
   the at least one memory and the computer program code configured to, with the at least one processor, cause the apparatus embedded in a mobile communication terminal to perform at least the following,
   store a first set of service provider settings related to a first plurality of client-server based services other than cellular communications services provided by a first service provider, in a first memory location specific for the first service provider, wherein the first set of service provider settings includes a service provider identification of the first service provider and user authentication information specific for a user to access the first plurality of client-server based services via at least one client application on the mobile communication terminal; and
   store a second set of service provider settings related to provisioning a second plurality of client-server based services provided by a second service provider, in a second memory location specific for the second service provider,
   wherein one instance of the first set of the service provider settings is used to configure the at least one client application executing on the mobile communication terminal for use in at least two client-server based services provided by the first service provider,
   wherein the at least one client application and at least one server of the first service provider comprise a client-server based service,
   wherein the first memory location and the second memory location are respective locations within a single memory structure, and wherein the first and second service provider settings occur only once in the memory location specific for the first service provider and occur only once for the second service provider,
   wherein an access to the first memory location or the second memory location is restricted to at least one client application, and
   wherein the at least one of the first and second sets of service provider settings is received via a message by the mobile communication terminal.

2. The apparatus according to claim 1, wherein the one instance of the first of service provider settings are useable by a plurality of client applications executing on the mobile communication terminal for use in the first plurality of client-server based services provided by the first service provider,
   wherein the first set of service provider settings is received via a wireless receiver of the mobile communication terminal.

3. The apparatus according to claim 1, wherein the first set of service provider settings are received from the at least one server for storage in the first memory location specific to the first service provider, and
wherein the first plurality of client-server based services include one or more game services, one or more mobile commerce services, or a combination thereof.

4. The apparatus according to claim 1, wherein the apparatus is further caused to:
wirelessly receive an updated first set of service provider settings from the at least one server; and
replace the first set of service provider settings in the first memory location with the updated first set of service provider settings by storing the updated first set of service provider settings in the first memory location.

5. The apparatus according to claim 1, wherein the user authentication information includes a username and a password of the user, and the first plurality of client-server based services share the username and the password.

6. The apparatus according to claim 1, wherein at least one of the service provider settings comprises service connectivity information for the at least one client application to access the first plurality of client-server based services via the mobile communication terminal, and
wherein the at least one client application is downloaded to the mobile communication terminal.

7. A method comprising:
storing, at a mobile communication terminal, a first set of service provider settings related to a first plurality of client-server based services other than cellular communications services provided by a first service provider, in a first memory location specific for the first service provider, wherein the first set of service provider settings includes a service provider identification of the first service provider and user authentication information specific for a user to access the first plurality of client-server based services via at least one client application on the mobile communication terminal; and
storing, at the mobile communication terminal, a second set of service provider settings related to provisioning a second plurality of client-server based services provided by a second service provider, in a second memory location specific for the second service provider,
wherein one instance of the first set of the service provider settings is used to configure the at least one client application executing on the mobile communication terminal for use in at least two client-server based services provided by the first service provider,
wherein the at least one client application and at least one server of the first service provider comprise a client-server based service,
wherein the first memory location and the second memory location are respective locations within a single memory structure, and wherein the first and second service provider settings occur only once in the memory location specific for the first service provider and occur only once for the second service provider, and
wherein an access to the first memory location or the second memory location is restricted to at least one client application.

8. The method according to claim 7, wherein the one instance of the first of service provider settings are useable by a plurality of client applications executing on the mobile communication terminal for use in the first plurality of client-server based services provided by the first service provider.

9. The method according to claim 7, wherein the first set of service provider settings are received from the at least one server for storage in the first memory location specific to the first service provider.

10. The method according to claim 7, further comprising:
receiving an updated first set of service provider settings from the at least one server; and
replacing the first set of service provider settings in the first memory location with the updated first set of service provider settings by storing the updated first set of service provider settings in the first memory location.

11. The method according to claim 7, wherein the user authentication information includes a username and a password of the user, and the first plurality of client-server based services share the username and the password.

12. The method according to claim 7, wherein at least one of the service provider settings comprises service connectivity information for the at least one client application to access the first plurality of client-server based services via the mobile communication terminal.

13. A mobile communication terminal configured to:
store a first set of service provider settings related to a first plurality of client-server based services other than cellular communications services provided by a first service provider, in a first memory location specific for the first service provider, wherein the first set of service provider settings includes a service provider identification of the first service provider and user authentication information specific for a user to access the first plurality of client-server based services via at least one client application on the mobile communication terminal; and
store a second set of service provider settings related to provisioning a second plurality of client-server based services provided by a second service provider, in a second memory location specific for the second service provider,
wherein one instance of the first set of the service provider settings is used to configure the at least one client application executing on the mobile communication terminal for use in at least two client-server based services provided by the first service provider,
wherein the at least one client application and at least one server of the first service provider comprise a client-server based service,
wherein the first memory location and the second memory location are respective locations within a single memory structure, and wherein the first and second service provider settings occur only once in the memory location specific for the first service provider and occur only once for the second service provider, and
wherein an access to the first memory location or the second memory location is restricted to at least one client application.

14. The mobile communication terminal according to claim 13, wherein the first set of service provider settings are received from the at least one server for storage in the first memory location specific to the first service provider; and
wherein the first memory location and the second memory location are respective locations within a single memory structure.

15. The mobile communication terminal according to claim 13, wherein the mobile communication terminal is further configured to:

receive an updated first set of service provider settings from the at least one server; and replace the first set of service provider settings in the first memory location with the updated first set of service provider settings by storing the updated first set of service provider settings in the first memory location.

* * * * *